United States Patent
Ramesh et al.

(10) Patent No.: US 11,894,022 B1
(45) Date of Patent: Feb. 6, 2024

(54) CONTENT SYSTEM WITH SENTIMENT-BASED CONTENT MODIFICATION FEATURE

(71) Applicant: Roku, Inc., San Jose, CA (US)

(72) Inventors: Sunil Ramesh, Cupertino, CA (US); Michael Cutter, Golden, CO (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/340,820

(22) Filed: Jun. 23, 2023

(51) Int. Cl.
  *G11B 27/031* (2006.01)
  *H04N 21/233* (2011.01)
  *G10L 25/63* (2013.01)
  *G10L 25/57* (2013.01)

(52) U.S. Cl.
  CPC ........... *G11B 27/031* (2013.01); *G10L 25/57* (2013.01); *G10L 25/63* (2013.01); *H04N 21/233* (2013.01)

(58) Field of Classification Search
  CPC ....... G11B 27/031; G10L 25/57; G10L 25/63; H04N 21/233
  See application file for complete search history.

(56) References Cited

U.S. PATENT DOCUMENTS

| | | | |
|---|---|---|---|
| 8,924,210 B2 | 12/2014 | Basson | |
| 9,418,152 B2 | 8/2016 | Nissan | |
| 2015/0155006 A1* | 6/2015 | Chou | G11B 27/031 386/230 |
| 2019/0158927 A1* | 5/2019 | Catalano | H04N 21/4394 |
| 2022/0084521 A1 | 3/2022 | Arvind | |

* cited by examiner

*Primary Examiner* — Mishawn N. Hunter
(74) *Attorney, Agent, or Firm* — McDonnell Boehnen Hulbert & Berghoff LLP

(57) ABSTRACT

In one aspect, an example method includes: (i) a computing system obtaining media content; (ii) the computing system extracting from the obtained media content, audio content; (iii) the computing system using at least the extracted audio content to obtain sentiment data associated with the audio content; (iv) the computing system using the obtained sentiment data as a basis to modify a video content component of the media content, thereby generating a modified version of the media content; and (v) the computing system outputting for presentation the generated modified media content.

18 Claims, 7 Drawing Sheets

| Sentiment Feature Vector | |
|---|---|
| Emotion | Score |
| Happiness | 91 |
| Sadness | 0 |
| Fear | 3 |
| Anger | 0 |
| Surprise | 18 |
| Disgust | 0 |
| * * * | * * * |

CONTENT SYSTEM WITH SENTIMENT-BASED CONTENT MODIFICATION FEATURE

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method includes: (i) a computing system obtaining media content; (ii) the computing system extracting from the obtained media content, audio content; (iii) the computing system using at least the extracted audio content to obtain sentiment data associated with the audio content; (iv) the computing system using the obtained sentiment data as a basis to modify a video content component of the media content, thereby generating a modified version of the media content; and (v) the computing system outputting for presentation the generated modified media content.

In another aspect, an example computing system is disclosed. The computing system is configured for performing a set of acts that includes: (i) obtaining media content; (ii) extracting from the obtained media content, audio content; (iii) using at least the extracted audio content to obtain sentiment data associated with the audio content; (iv) using the obtained sentiment data as a basis to modify a video content component of the media content, thereby generating a modified version of the media content; and (v) outputting for presentation the generated modified media content.

In another aspect, an example non-transitory computer-readable medium is disclosed. The computer-readable medium has stored thereon program instructions that upon execution by a computing system, cause performance of a set of acts that includes: (i) obtaining media content; (ii) extracting from the obtained media content, audio content; (iii) using at least the extracted audio content to obtain sentiment data associated with the audio content; (iv) using the obtained sentiment data as a basis to modify a video content component of the media content, thereby generating a modified version of the media content; and (v) outputting for presentation the generated modified media content.

BRIEF DESCRIPTION OF THE DRAWINGS

FIG. 3 is a simplified block diagram of example sentiment feature vector.

DETAILED DESCRIPTION

I. Overview

After media content (e.g., a movie or television program) is made, for a variety of reasons, it may be desirable to modify the media content. For instance, after production, an executive team may decide that in a given segment, an actor's facial expressions were not as expected, and therefore the team may seek to have that segment re-recorded. The executive team might make such a decision based on a belief that an audience may not find the original acting engaging or convincing. Unfortunately, however, re-recording a segment is time consuming and labor intensive.

Disclosed herein are systems and corresponding methods to address these and other issues. According to one aspect of the disclosure, a content manager component of a computing system can obtain media content and extract from the obtained media content, audio content. The content manager can then use at least the extracted audio content to obtain sentiment data associated with the audio content. Sentiment data is data that indicates an emotion or other sentiment-type characteristic of the audio content. For example, sentiment data could indicate that the audio content is associated with one or more emotions, such as happiness, sadness, fear, anger, surprise, and/or disgust, among numerous other possibilities. The content manager 102 can obtain sentiment data associated with audio content in various ways, such as by using a trained sentiment analysis model. As such, in one example, the content manager obtaining sentiment data can involve the content manager classifying the sentiment of the extracted audio by processing it with a deep neural network.

The content manager can then use the obtained sentiment data as a basis to modify a video content component of the media content, thereby generating a modified version of the media content. The content manager can modify the video content in various ways, such as by modifying a facial expression of an actor depicted in the video, such that the facial expression of the actor corresponds to the obtained sentiment data. The content manager can carry out this modification in various ways, such as detecting facial landmarks to understand the region of interest in the video, and then making modifications accordingly to update the facial expressions. Detecting facial landmarks and making modifications can be done in various ways, such as by training and using a facial expression modification model. As another example, the content manager could employ a text to image generation model of the masked region of the video, such as by providing the model with a prompt such as "a picture of a happy person," to obtain an image that could be used in connection with modifying the facial expression. The content manager can then output for presentation the generated modified media content.

II. Example Architecture

A. Content System

Figure 1:
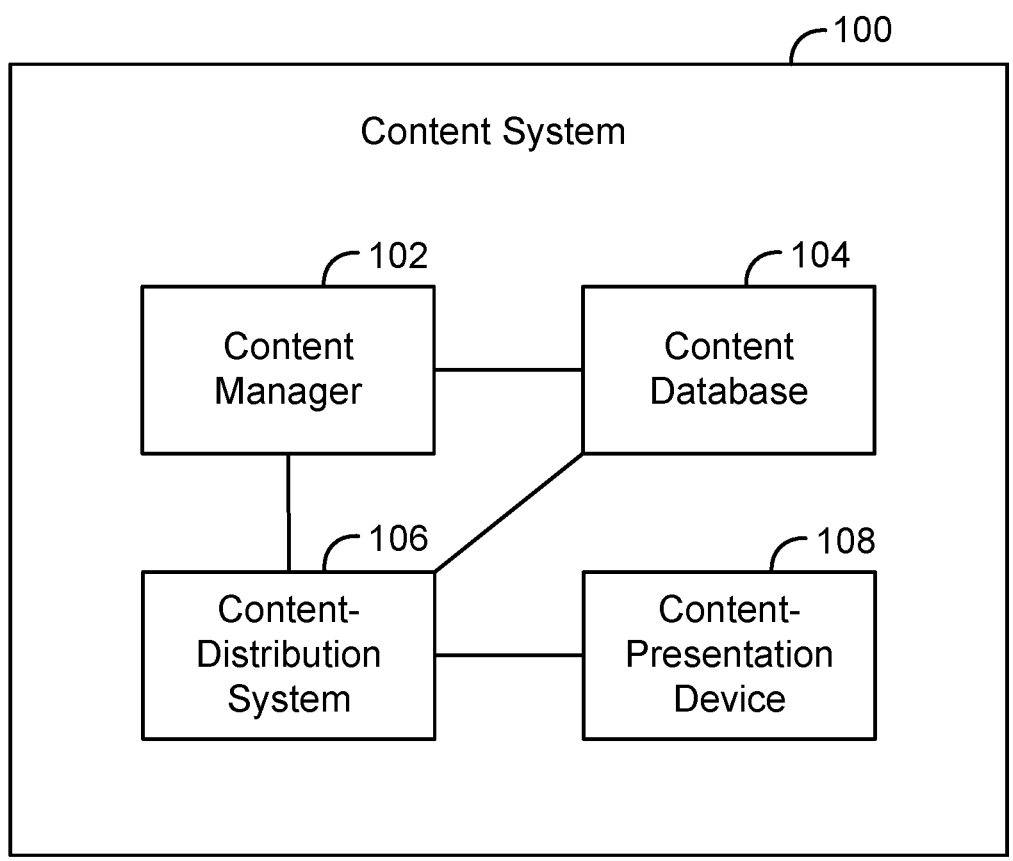
FIG. 1 is a simplified block diagram of an example content system in which various described principles can be implemented.

FIG. 1 is a simplified block diagram of an example content system 100. Generally, the content system 100 can perform operations related to various types of content, such as media content, which can take the form of video content and/or audio content. As such, the media content can include a video content component and/or an audio content component. There can be various types of media content. For example, media content can be, or include, a movie, a television show, a commercial, or a portion or combination thereof, among numerous other possibilities.

Media content can be represented by media data, which can be generated, stored, and/or organized in various ways and according to various formats and/or protocols, using any related techniques now known or later discovered. For example, the media content can be generated by using a camera, a microphone, and/or other equipment to capture or record a live-action event. In another example, the media content can be synthetically generated, such as by using one or more of the techniques described in this disclosure, or by using any related media content generation techniques now known or later discovered.

As noted above, media data can also be stored and/or organized in various ways. For example, the media data can be stored and organized as a Multimedia Database Management System (MDMS) and/or in various digital file formats, such as the MPEG-4 format, among numerous other possibilities.

The media data can represent the media content by specifying various properties of the media content, such as video properties (e.g., luminance, brightness, and/or chrominance values), audio properties, and/or derivatives thereof. In some instances, the media data can be used to generate the represented media content. But in other instances, the media data can be a fingerprint or signature of the media content, which represents the media content and/or certain characteristics of the media content, and which can be used for various purposes (e.g., to identify the media content or characteristics thereof), but is not sufficient at least on its own to generate the represented media content.

In some instances, media content can include metadata associated with the video and/or audio content. In the case where the media content includes video content and audio content, the audio content is generally intended to be presented in sync with the video content. To help facilitate this, the media data can include metadata that associates portions of the video content with corresponding portions of the audio content. For example, the metadata can associate a given frame or frames of video content with a corresponding portion of audio content. In some cases, audio content can be organized into one or more different channels or tracks, each of which can be selectively turned on or off, or otherwise controlled.

In some instances, media content can be made up of one or more segments. For example, in the case where the media content is a movie, the media content may be made up of multiple segments, each representing a scene (or perhaps multiple scenes) of the movie. As another example, in the case where the media content is a television show, the media content may be made up of multiple segments, each representing a different act (or perhaps multiple acts) of the show. In various examples, a segment can be a smaller or larger portion of the media content. For instance, a segment can be a portion of one scene, or a portion of one act. Or a segment can be multiple scenes or multiple acts, or various portions thereof.

Returning back to the content system 100, this can include various components, such as: a content manager 102, a content database 104, a content-distribution system 106, and a content-presentation device 108. The content system 100 can also include one or more connection mechanisms that connect various components within the content system 100. For example, the content system 100 can include the connection mechanisms represented by lines connecting components of the content system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, a communication (e.g., a transmission or receipt of data) can be a direct or indirect communication.

In some instances, the content system 100 can include multiple instances of at least some of the described components. The content system 100 and/or components thereof can take the form of a computing system, an example of which is described below.

B. Computing System

Figure 2:
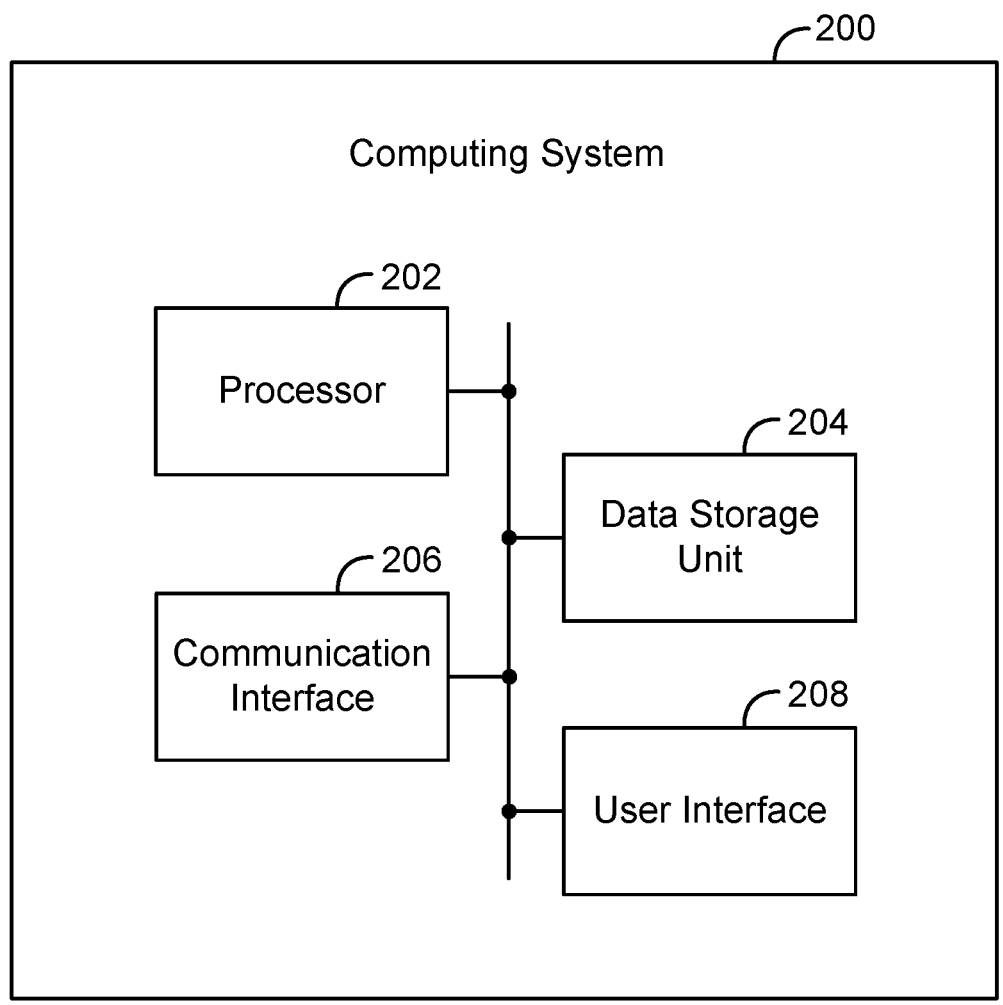
FIG. 2 is a simplified block diagram of an example computing system in which various described principles can be implemented.

FIG. 2 is a simplified block diagram of an example computing system 200. The computing system 200 can be configured to perform and/or can perform various operations, such as the operations described in this disclosure. The computing system 200 can include various components, such as: a processor 202, a data storage unit 204, a communication interface 206, and/or a user interface 208.

The processor 202 can be, or include, a general-purpose processor (e.g., a microprocessor) and/or a special-purpose processor (e.g., a digital signal processor). The processor 202 can execute program instructions included in the data storage unit 204 as described below.

The data storage unit 204 can be or include one or more volatile, non-volatile, removable, and/or non-removable storage components, such as magnetic, optical, and/or flash storage, and/or can be integrated in whole or in part with the processor 202. Further, the data storage unit 204 can be, or include, a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or Wi-Fi interface.

The user interface 208 can allow for interaction between the computing system 200 and a user of the computing system 200. As such, the user interface 208 can be or include an input component such as: a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, such as a partially or fully cloud-based arrangement, for instance.

As noted above, the content system 100 and/or components of the content system 100 can take the form of a computing system, such as the computing system 200. In some cases, some or all of these entities can take the form of a more specific type of computing system, such as: a desktop or workstation computer, a laptop, a tablet, a mobile phone, a television, a set-top box, a streaming media device, and/or a head-mountable display device (e.g., virtual-reality headset or an augmented-reality headset), among numerous other possibilities.

III. Example Operations

The content system 100, the computing system 200, and/or components of either can be configured to perform and/or can perform various operations. As noted above, the content system 100 can perform operations related to media content. But the content system 100 can also perform other operations. Various example operations that the content system 100 can perform, and related features, will now be described with reference to select figures.

As noted above, the content system 100 can perform operations related to sentiment-based content modification. In one aspect, this can involve the content system 100 (*i*) obtaining media content; (ii) extracting from the obtained media content, audio content; (iii) using at least the extracted audio content to obtain sentiment data associated with the audio content; (iv) using the obtained sentiment data as a basis to modify a video content component of the media content, thereby generating a modified version of the media content; and (v) outputting for presentation the generated modified media content. These and related operations will now be described in greater detail.

A. Obtaining Media Content

To begin, the content manager 102 can obtain media content, which can include a video content component and an audio content component. For example, the media content can be a movie that includes a video content component and an audio content component, which itself may include different components of audio content, such as speech, along with one or more non-speech components, such as music and/or sound effects, among numerous other possibilities. In some examples, the obtained media content could be a segment or some other portion of the movie or other media content.

The content manager 102 can obtain media content in various ways, such as by selecting media content based on input received from a user via a user interface, and then obtaining the selected media content. The content manager 102 can do this in various ways, such as by automatically selecting media content based on one or more predefined rules, and then obtaining the selected media content. The content manager 102 can then obtain the selected media content in various ways, such as by retrieving from a media content database such as the content database 104, media data representing the selected media content.

B. Extracting Audio Content

The content manager 102 can then extract from the obtained media content, audio content. In some instances, the extracted audio content can be the entire audio content component of the media content. However, in other instances, the extracted audio content can be a portion thereof. For example, the extracted audio content can be a portion that represents speech, music, sound effects, or some other category of audio content, or perhaps some combination thereof. The extracted audio content can be a separate audio track within the audio content, or it can be a portion of the audio content component that is tagged such that the content manager 102 can isolate and extract the audio content from any remaining audio content included in the media content.

Audio content can be isolated and extracted in other ways as well. For example, in the case where the audio content being extracted is audio content representing speech, the content system 100 can isolate and/or extract the audio content representing speech from other audio content by employing any speech isolation and/or extraction technique now known or later discovered.

The extracted audio content can be stored in various ways (e.g., as audio data representing the audio content, stored in an audio file format), as with any audio content. By extracting the audio content, the content system 100 can then perform one or more operations in connection with that extracted audio content, examples of which will be described below.

C. Obtaining Sentiment Data

In one example, the content manager 102 can use the extracted audio content to obtain sentiment data associated with the audio content. Sentiment data is data that indicates an emotion or other sentiment-type characteristic of the audio content. For example, sentiment data could indicate that certain audio content is associated with one or more emotions, such as happiness, sadness, fear, anger, surprise, and/or disgust, among numerous other possibilities. In practice, there could be lots of different types of emotions or other possible types of sentiment data that could be associated with audio content.

Sentiment data associated with audio content can be represented in various ways. For instance, the sentiment data can be represented in the form of a sentiment feature vector, with a given score (e.g., from 0-100) being assigned to each of multiple different emotions or other indicators, to indicate a degree or confidence score of each one, with 0 being the lowest and 100 being the highest, as just one example. For instance, for given audio content, the sentiment feature vector could indicate a score of 91 for happiness, a score of 0 for sadness, a score of 3 for fear, and so on. As such, in the case where the audio content is audio content representing speech, the score of 91 for happiness can indicate that the speech is associated with a high degree of happiness (e.g., based on acoustic characteristics, based on the meaning or semantics of the words themselves) or that the likelihood of the audio content being associated with happiness is quite high, etc. Similarly, the score of 0 for sadness can indicate that the speech is associated with a low or non-existent degree of sadness or that the likelihood of the audio content being associated with sadness is quite low or non-existent, and so on for each of the other features in the vector.

FIG. 3 is a simplified block diagram of example sentiment feature vector 300 in line with the example discussed above. As shown, the sentiment feature vector 300 indicates a score of 91 for happiness, a score of 0 for sadness, a score of 3 for fear, and so on. Many other ways of representing sentiment data are possible as well.

The content manager 102 can obtain sentiment data associated with audio content in various ways. For example, the content manager 102 can do this by employing a machine learning technique, such as one that uses a deep neural network (DNN) to train a sentiment analysis model to use a runtime input data set that includes audio content to generate a runtime output data set that includes sentiment data. Example techniques for implementing such a sentiment analysis model include those described in "Understanding Emotion Classification in Audio Data" by Banerjee et al. and "Audio Sentiment Analysis by Heterogeneous Signal Features Learned from Utterance-Based Parallel Neural Network" by Luo et al. In some cases, it may be desirable to use a model that is especially suited for the type of audio content being extracted. For example, in the case where the audio content includes speech, a sentiment analysis model geared towards analyzing sentiment in that type of audio content can be used. Likewise, other models might be used in different scenarios, such as where the audio content includes music, sound effects, or some combination of different types of audio content, for instance.

Regardless of the employed model, before the content manager 102 uses a sentiment analysis model to analyze a runtime input data set to generate a runtime output data set, the content manager 102 can first train the model by providing it with training input data sets and training output data sets. Each of the training input data sets can include respective audio content, and each of the training output data sets can include respective sentiment data.

In practice, it is likely that large amounts of training data—perhaps thousands of training data sets or more—would be used to train the model as this generally helps improve the usefulness of the model. Training data can be generated in various ways, including by being manually assembled. However, in some cases, the one or more tools or techniques, including any training data gathering or organization techniques now known or later discovered, can be used to help automate or at least partially automate the process of assembling training data and/or training the model.

In some examples, the content manager 102 can use one or more synthetic data generation techniques to generate synthetic data, which can be used as at least part of the training data. This can be done in various ways. For example, in the case of audio content representing speech, the content manager 102 can generate synthetic audio content based on certain input data (e.g., text to be uttered, a voice profile, and sentiment data) and the content manager 102 can then use that input data to generate a spoken version of the text that has emotion in line with the sentiment data. The content manager 102 can then provide the generated audio content and the associated sentiment data used as input to the sentiment analysis model, as part of a training input data set. Notably, by varying input parameters (e.g., types of audio content, types and scores of emotions, etc.), the content manager 102 can generate lots of different instances of synthetic/training data covering many different examples of audio content, sentiment data, etc.

After the model is trained, the content manager 102 can then provide to the model runtime input data, which the model can use to generate runtime output data. Generally, the runtime input data is of the same type as the training input data. In this way, the model can use the extracted audio content to generate sentiment data associated with the extracted audio content. In some instances, the content manager 102 can execute the model. But in other instances, the model can be executed by another entity. As such, in some examples, using at least the extracted audio content to obtain sentiment data associated with the audio content can involve providing at least the extracted audio content to a sentiment analysis model and responsively receiving from the sentiment analysis model sentiment data associated with the audio content.

In some examples, where the audio content represents speech, the content manager 102 can employ a speech-to-text model to convert the speech to text that can be used to help the content manager 102 obtain sentiment data. Various speech-to-text models can be used for this purpose. Example techniques for implementing a speech-to-text model include or are based on linear predictive coding (LPC), mel-frequency cestrum co-efficient (MFCC), dynamic time wrapping, and/or a hidden markov model (HMM). The content manager 102 can store the generated text in various ways, such as by storing representative text data as a text file in a database, for instance.

In the case where the content manager 102 obtains such text, the content manager 102 can provide the text as input data (in addition to the audio content) to the sentiment analysis model (both when training the sentiment analysis model and when using it at runtime). Among other things, this can allow the sentiment analysis model to consider aspects of the text to help analyze the audio content to determine associated sentiment, as certain words may be associated with one or more emotions, etc. As with the sentiment analysis model, in some instances, the content manager 102 can execute the speech-to-text model. But in other instances, the model can be executed by another entity. As such, in some examples, using at least the extracted audio content to obtain sentiment data associated with the audio content can involve (i) providing at least the extracted audio content to a speech-to-text model and responsively receiving from the speech-to-text model text representing the audio content; and (ii) providing at least the received text data to a sentiment analysis model and responsively receiving from the sentiment analysis model sentiment data associated with the audio content.

During training and runtime, other data can be provided as input to the sentiment analysis model as well. For instance, certain structured data can be provided as input data. In some instances, such as where the media content and/or its audio content component was synthetically generated, that synthetic generation may have been generated based at least in part on certain structured data, which can then be used as an input into the sentiment analysis model.

There is wide variety of structured data available on the Internet and from other sources that can be used for this purpose. Structured data includes data types with patterns that make them easily searchable. For instance, structured data includes data that is in a standardized format having a well-defined structure such that the format and meaning of the data is explicitly understood. As such, structured data is easily accessible using computer algorithms. Structured data can include textual data and/or numeric data. Examples of structured data include: sports box scores, weather forecasts, financial information, real estate records, entertainment summaries, etc. Since structured data can be used to drive synthetic generation of media content and/or an audio content component of the media content, that structured data can be representative of an emotion or other sentiment associated with that audio content, and thus it can be leveraged in connection with the content manager 102 obtaining sentiment data associated with the audio content.

As such, in some examples, the content manager 102 can obtain structured data associated with the media content, and the content manager 102 using at least the extracted audio content to obtain sentiment data associated with the audio content can involve the content manager 102 using at least the extracted audio content and the obtained structured data to obtain sentiment data associated with the audio content.

Notably, instead of, or in addition to, using audio content to obtain sentiment data, the content system 100 can use video content to obtain the sentiment data. In one example, this can be done by way of the sentiment analysis model being trained and run not only with audio content, but also with video content as input data. In this way, the model can use aspects of the video content (e.g., depictions of certain objects in the video content that may be associated with one or more emotions) to train itself, such that during runtime, the model can consider characteristics of the video content in outputting corresponding sentiment data.

D. Generating Modified Media Content

Next, the content manager 102 can use the obtained sentiment data as a basis to modify a video content component of the media content, thereby generating a modified version of the media content. The content manager 102 can modify the video content in various ways.

In one example, the content manager 102 can modify the video by modifying a visual depiction of an actor (which could be a real actor or a synthetically generated actor) within the video content. For instance, in the case where the audio content represents speech uttered by an actor in video content that corresponds to the audio content, and the sentiment data represents an emotion of the actor, the content manager 102 can use the obtained sentiment data as a basis to modify a facial expression of the actor in that video content. In this way, the content manager 102 can help ensure that the facial expression of the actor corresponds to (or more closely corresponds to) that actor's emotion in view of the audio content.

For example, in the case where the audio content is associated with sentiment data indicating a happiness emotion, the content manager 102 might modify the actor's facial expression with changes such as exhibiting a smile, raising the corners of the lip diagonally, tightening muscles around the eyes, adding "crow's feet" wrinkles around the eyes, and/or raising the cheeks, among other possibilities. As another example, in the case where the audio content is associated with sentiment data indicating a sadness emotion, the content manager 102 might modify the actor's facial expression with changes such as raising the inner corners of the eyebrows, loosening the eyelids, and/or pulling down the corners of the lip, among other possibilities. As yet another example, in the case where the audio content is associated with sentiment data indicating a surprised emotion, the content manager 102 might modify the actor's facial expression with changes such as pulling up the eyebrows or eyelids, opening the mouth, and/or dilating the pupils, among other possibilities.

In some instances, the content manager 102 can modify certain portions of the actor's facial expression while preserving others. For instance, in the case where the actor is uttering speech, it may be desirable to generally preserve the actor's mouth movements so as to not interfere with the synchronization between the mouth movements and words being spoken. As such, in this instance, it may be desirable to modify other portions of the actor's facial expression only.

The content manager 102 can use the obtained sentiment data as a basis to modify a facial expression of the actor in that video content in various ways. For example, the content manager 102 can do this by employing a machine learning technique, such as one that uses a DNN to train a facial expression modification model to use a runtime input data set that includes input video content and sentiment data, to generate a runtime output data set that includes output video content that is a modified version of the input video content (i.e., modified with facial expression changes based on the sentiment data). Example techniques for implementing such a facial expression modification model include those described in "Continuously Controllable Facial Expression Editing in Talking Face Videos" by Sun et al. and "Facial Expression Editing with Continuous Emotion Labels" by Lindt et al.

Regardless of the model used, before the content manager 102 uses a facial expression modification model to analyze a runtime input data set to generate a runtime output data set, the content manager 102 can first train the model by providing it with training input data sets and training output data sets. Each of the training input data sets can include respective input video content data and sentiment data, and each of the training output data sets can include output video content data.

As with the other example models discussed above, in practice, it is likely that large amounts of training data—perhaps thousands of training data sets or more—would be used to train the model as this generally helps improve the usefulness of the model. Training data can be generated in various ways, including by being manually assembled. However, in some cases, the one or more tools or techniques, including any training data gathering or organization techniques now known or later discovered, can be used to help automate or at least partially automate the process of assembling training data and/or training the model.

In some examples, the content manager 102 can use one or more synthetic data generation techniques to generate synthetic data, which can be used as at least part of the training data. Indeed, the content manager 102 can use any synthetic video generation techniques now known or later discovered to synthetically generate video content with varying facial expressions, each based on respective sentiment data. For example, the content manager 102 can generate first video content of a given actor with a baseline emotion, and the content manager 102 can then also generate second video content, which is the same as the first video content, except that the second video content is based on a sadness emotion. With this generated video content, the content manager 102 can then provide the first video content and sentiment data that indicates a sadness emotion, as training input data, and can further provide the second video content as training output data. In this way, the content manager 102 can train the model as to how video content associated with a baseline or neutral emotion can be modified such that it can instead be associated with a sadness emotion. This can be repeated on a much larger and more complex scale with different instances of video content and sentiment data, to further train the model.

Figure 4:
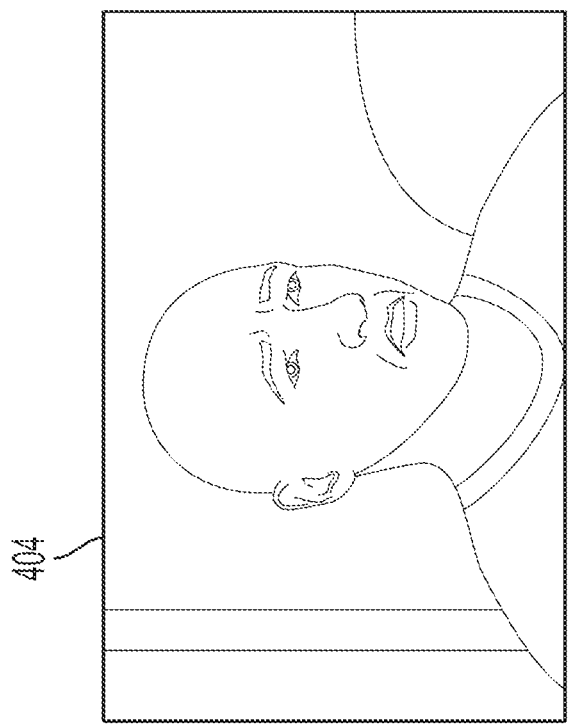
FIG. 4 is a depiction of example frames of video content.
Figure 4:
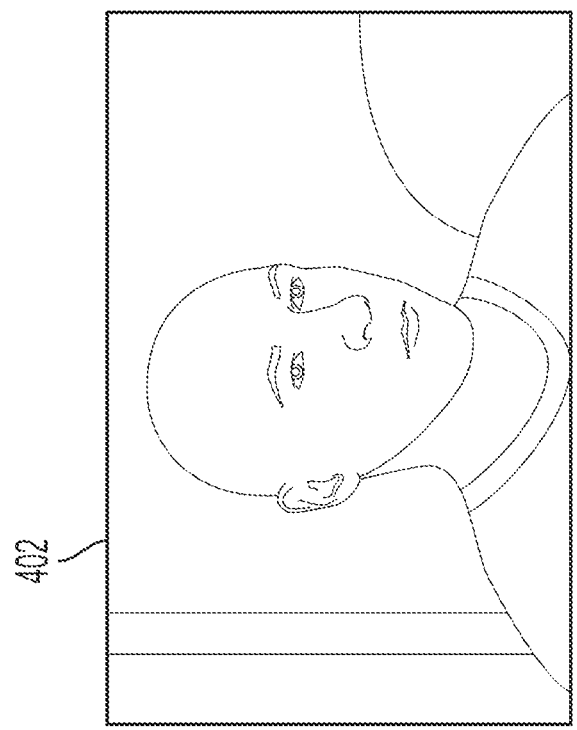

After the model is trained, the content manager 102 can then provide to the model runtime input data, which the model can use to generate runtime output data. Generally, the runtime input data is of the same type as the training input data as described above. In this way, the model can generate output video content that is a modified version of the input video content, and that has been modified to reflect the sentiment indicated by the sentiment data. FIG. 4 depicts examples frames of video content to help illustrate this. In particular, FIG. 4 depicts a frame 402 of first video content that depicts an actor associated with a baseline emotion, and a frame 404 of a second video content that depicts the same actor associated with a sadness emotion, with raised the inner corners of the eyebrows, pulled down the corners of the lip, etc. In this example, the second video content is what results from the content manager 102 modifying the first video content, based on the sentiment data indicating a sadness emotion. Similar modification could then be made to addition frames of the video content.

In practice, the facial expression modification model can modify video content in more nuanced ways, such as by modifying based on multiple emotions, to varying degrees based on scores in the corresponding sentiment feature vector, for example, etc. Also, in connection with such facial expression modifications, the duration of audio content analyzed/considered for purposes of obtaining the sentiment data, and the duration of video content that is modified (e.g., by way of a modified facial expression) can vary. Indeed in some instances, it may be desirable to use audio content of a given duration to obtain associated sentiment data, and then modify video content of that same duration, where the video content corresponds with the audio content. That duration can vary in length. For instance, the duration could be several minutes or seconds, or it could perhaps be very short, perhaps even fractions of a second, in which case the model may be detecting very subtle micro-emotions, that drive very small changes in facial expressions over a short time period perhaps at the phoneme level. But in other cases, it may be desirable to use macro-emotions that are associated with audio content of a larger duration, to cause facial expressions to be modified in video content that has a relatively shorter duration. In this way, the model can determine a macro-emotion of a given segment, which could be used to cause modification of an actor depicted in a shorter portion of the corresponding video content.

In some instances, the content manager 102 can execute the facial expression modification model. But in other instances, the model can be executed by another entity. As such, in some examples, using the obtained sentiment data as a basis to modify a video content component of the media content can involve providing at least the obtained sentiment data and the video content to a facial expression modification model and responsively receiving from the facial expression modification model modified video content.

As discussed above, one way in which the content manager 102 can use the obtained sentiment data as a basis to modify a visual depiction of an actor is to modify a facial expression of the actor. However, the content manager 102 can use the obtained sentiment data as a basis to modify a visual depiction of an actor in other ways as well. For example, the content manager 102 can do this by modifying a body movement of the actor, to likewise help ensure that the body movement of the actor corresponds with (or more closely corresponds with) that actor's emotion in view of the audio content. For example, in the case where the audio content is associated with sentiment data indicating an angry emotion, the content manager 102 might modify the actor's body movements with changes such as clenching the actor's fists, among numerous other possibilities.

The content manager 102 can use the obtained sentiment data as a basis to modify a body movement of the actor in that video content in all of the same ways described above with respect to modifying facial expressions, except that references to facial expressions would be replaced with references to body movements. As such, for instance, the content manager 102 could train and use a model that modifies video content by modifying body movements.

In some instances, the content manager 102 can use a combination of multiple models (e.g., by using one model to modify video content by modifying facial expressions, and then using another model to further modify the video content by modifying body movements). And in another example, a model could be configured to modify video content by modifying both facial expressions and body movements at the same time.

E. Outputting the Generated Modified Media Content

Next, the content manager 102 can output the generated modified media content for presentation. The content manager 102 can do this in various ways. In one example, this can include the content-distribution system 106 transmitting the generated media to the content-presentation device 108, which can receive and output the generated media content for presentation, such that it can be viewed by a user.

The content-distribution system 106 can transmit media content on one or more channels (sometimes referred to as stations or feeds). As such, the content-distribution system 106 can be associated with a single channel content distributor or a multi-channel content distributor such as a multi-channel video program distributor (MVPD).

The content-distribution system 106 and its means of transmission of media content on the channel to the content-presentation device 108 can take various forms. By way of example, the content-distribution system 106 can be or include a cable-television head-end that is associated with a cable-television provider and that transmits the media content on the channel to the content-presentation device 108 through hybrid fiber/coaxial cable connections. As another example, the content-distribution system 106 can be or include a satellite-television head-end that is associated with a satellite-television provider and that transmits the media content on the channel to the content-presentation device 108 through a satellite transmission. As yet another example, the content-distribution system 106 can be or include a television-broadcast station that is associated with a television-broadcast provider and that transmits the content on the channel through a terrestrial over-the-air interface to the content-presentation device 108. And as yet another example, the content-distribution system 106 can be an Internet-based distribution system that transmits the media content using a media content streaming-characteristic service or the like to the content-presentation device 108.

In these and other examples, the content-distribution system 106 can transmit the content in the form of an analog or digital broadcast stream representing the media content.

The content-presentation device 108 can receive media content from one or more entities, such as the content-distribution system 106. In one example, the content-presentation device 108 can select (e.g., by tuning to) a channel from multiple available channels, perhaps based on input received via a user interface, such that the content-presentation device 108 can receive media content on the selected channel.

In some examples, the content-distribution system 106 can transmit media content to the content-presentation device 108, which the content-presentation device 108 can receive. The content-presentation device 108 can also output media content for presentation. As noted above, the content-presentation device 108 can take various forms. In one example, in the case where the content-presentation device 108 is a television (perhaps with an integrated set-top box and/or streaming media device), outputting the media content for presentation can involve the television outputting the media content via a user interface (e.g., a display device and/or a sound speaker), such that it can be presented to an end-user. As another example, in the case where the content-presentation device 108 is a set-top box or a streaming media device, outputting the media content for presentation can involve the set-top box or the streaming media stick outputting the media content via a communication interface (e.g., an HDMI interface), such that it can be received by a television and in turn output by the television for presentation to an end-user.

As such, in various scenarios, the content-distribution system 106 can transmit media content to the content-presentation device 108, which can receive and output the media content for presentation to an end-user.

F. Editing System

In some instances, the content system 100 can include an editing system component that allows a user to review, approve, reject, and/or edit various operations or results of operations, as part of a quality assurance process. For instance, in the context of the content manager 102 using at least the extracted audio content to obtain sentiment data associated with the audio content, the editing system can provide tentative sentiment data that allows a user of the editing system to review and approve (perhaps with some user input/editing) that data. Additionally or alternatively, in the context of the content manager 102 using the obtained sentiment data as a basis to modify a video content component of the media content, thereby generating a modified version of the media content, the editing system can allow the user to review and approve (perhaps with some user input/editing) how the video content is modified. Notably, such a user interfacing with the editing system could be an end-user, or perhaps a user tasked with producing/editing media content so that it can be provided to an end-user, for example.

G. Example Methods

Figure 5:
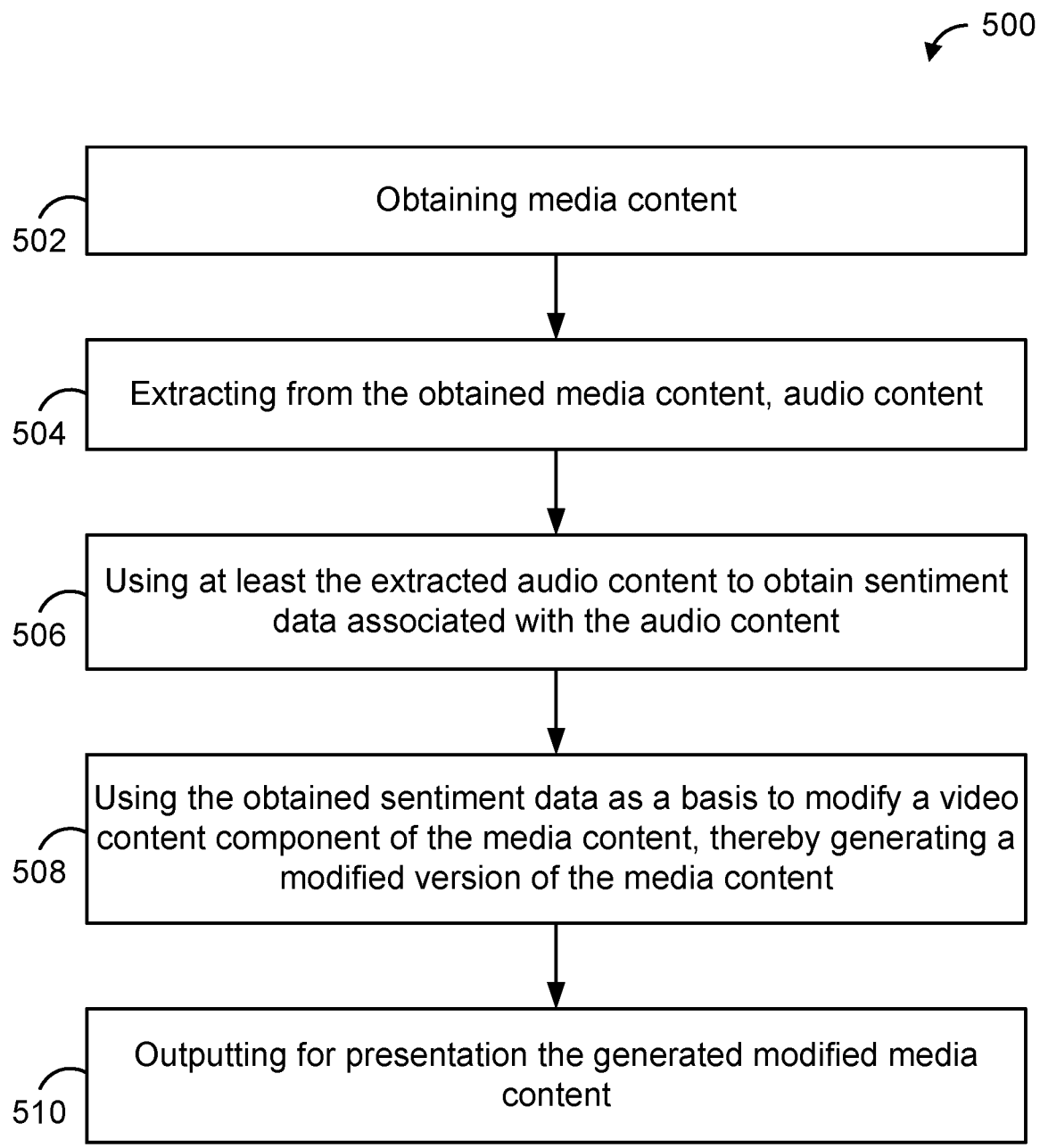
FIG. 5 is a flow chart of an example method.

FIG. 5 is a flow chart illustrating an example method 500. The method 500 can be carried out by a content system, such as the content system 100, or more generally, by a computing system, such as the computing system 200. At block 502, the method 500 includes obtaining media content. At block 504, the method 500 includes extracting from the obtained media content, audio content. At block 506, the method 500 includes using at least the extracted audio content to obtain sentiment data associated with the audio content. At block 508, the method 500 includes using the obtained sentiment data as a basis to modify a video content component of the media content, thereby generating a modified version of the media content. And at block 510, the method 500 includes outputting for presentation the generated modified media content.

In various examples, the extracted audio content represents speech of an actor in the video content, the sentiment data represents an emotion of the actor in the video content, and modifying the video content component of the media content involves modifying a visual depiction of the actor.

In some implementations, using the obtained sentiment data as a basis to modify the video content component of the media content involves using the obtained sentiment data as a basis to modify a facial expression of the actor. And in others, using the obtained sentiment data as a basis to modify the video content component of the media content comprises using the obtained sentiment data as a basis to modify a body movement of the actor.

In various examples, using at least the extracted audio content to obtain sentiment data associated with the audio content involves providing at least the extracted audio content to a sentiment analysis model and responsively receiving from the sentiment analysis model sentiment data associated with the audio content.

In some implementations, using at least the extracted audio content to obtain sentiment data associated with the audio content involves: (i) providing at least the extracted audio content to a speech-to-text model and responsively receiving from the speech-to-text model text representing the audio content; and (ii) providing at least the received text to a sentiment analysis model and responsively receiving from the sentiment analysis model sentiment data associated with the audio content.

In some examples, using at least the extracted audio content to obtain sentiment data associated with the audio content involves: (i) providing at least the extracted audio content to a speech-to-text model and responsively receiving from the speech-to-text model text representing the audio content; and (ii) providing at least the extracted audio content and the received text to a sentiment analysis model and responsively receiving from the sentiment analysis model sentiment data associated with the audio content.

In some cases, the method 500 can further include obtaining structured data associated with the media content, and using at least the extracted audio content to obtain sentiment data associated with the audio content involves using at least the extracted audio content and the obtained structured data to obtain sentiment data associated with the audio content.

With respect to outputting for presentation, the generated modified media content, this can involve transmitting to a presentation device (e.g., a television), media data representing the generated modified media content for display by the presentation device, and/or this can involve a device (e.g., a television) displaying the generated modified media content, for example.

Figure 6:
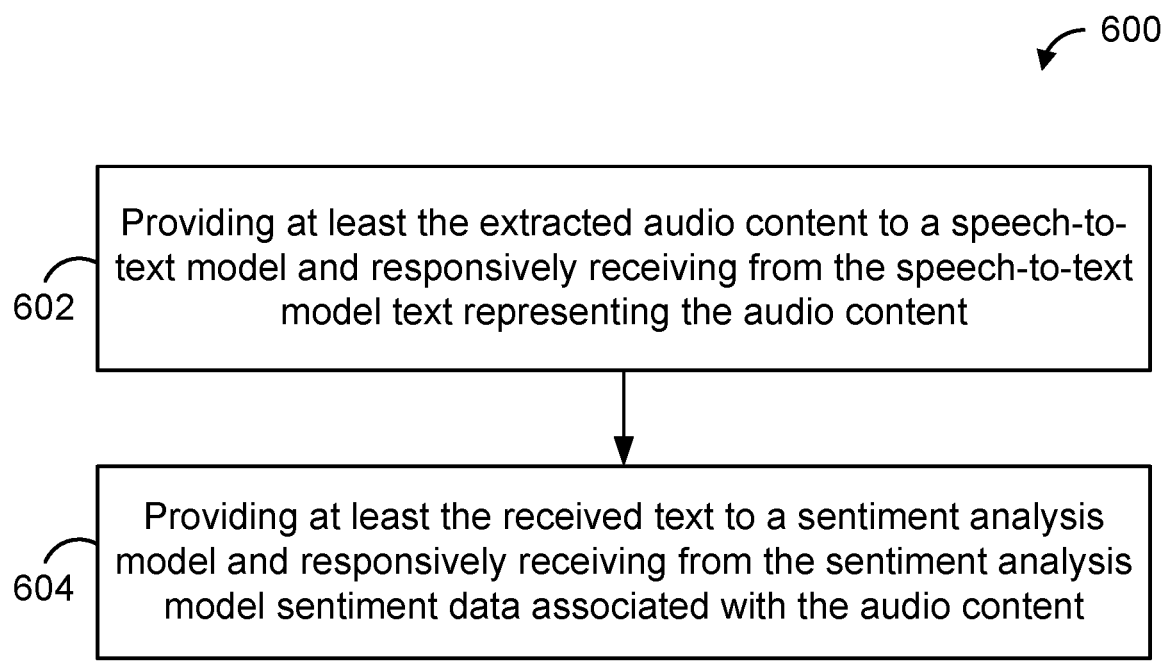
FIG. 6 is a flow chart of another example method.

FIG. 6 is a flow chart illustrating an example method 600. The method 600 can be carried out by a content system, such as the content system 100, or more generally, by a computing system, such as the computing system 200. The method 600 can be a technique for using at least the extracted audio content to obtain sentiment data associated with the audio content comprises. At block 602, the method 600 can include providing at least the extracted audio content to a speech-to-text model and responsively receiving from the speech-to-text model text representing the audio content. And at block 604, the method 600 can include providing at least the received text to a sentiment analysis model and responsively receiving from the sentiment analysis model sentiment data associated with the audio content.

Figure 7:
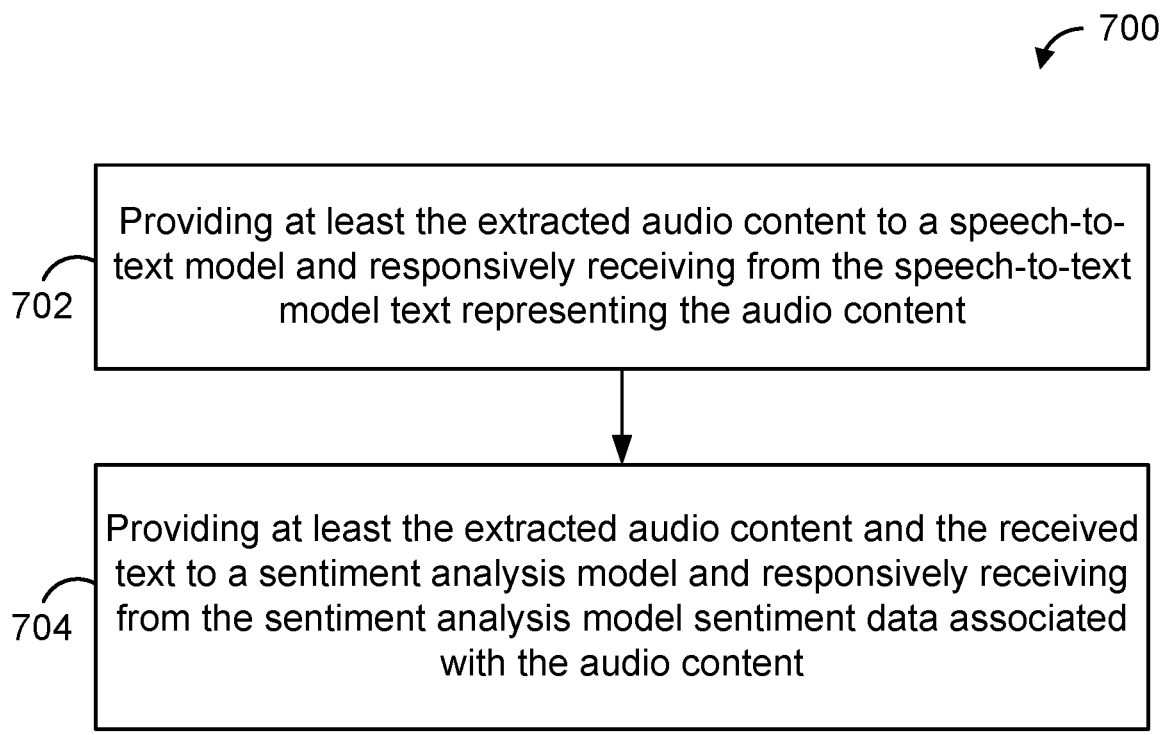
FIG. 7 is a flow chart of still another example method.

FIG. 7 is a flow chart illustrating an example method 700. The method 700 can be carried out by a content system, such as the content system 100, or more generally, by a computing system, such as the computing system 200. The method 700 can be a technique for using at least the extracted audio content to obtain sentiment data associated with the audio content comprises. At block 702, the method 700 can include providing at least the extracted audio content to a speech-to-text model and responsively receiving from the speech-to-text model text representing the audio content. And at block 704, the method 700 can include providing at least the extracted audio and the received text to a sentiment analysis model and responsively receiving from the sentiment analysis model sentiment data associated with the audio content.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
a computing system obtaining media content;
the computing system extracting from the obtained media content, audio content;
the computing system using at least the extracted audio content to obtain sentiment data associated with the audio content;
the computing system using the obtained sentiment data as a basis to modify a video content component of the media content, thereby generating a modified version of the media content, wherein the extracted audio content represents speech of an actor in the video content, wherein the sentiment data represents an emotion of the actor in the video content, and wherein modifying the video content component of the media content comprises modifying a visual depiction of the actor; and
the computing system outputting for presentation the generated modified media content.

2. The method of claim 1, wherein using the obtained sentiment data as a basis to modify the video content component of the media content comprises using the obtained sentiment data as a basis to modify a facial expression of the actor.

3. The method of claim 1, wherein using the obtained sentiment data as a basis to modify the video content component of the media content comprises using the obtained sentiment data as a basis to modify a body movement of the actor.

4. The method of claim 1, wherein using at least the extracted audio content to obtain sentiment data associated with the audio content comprises:
providing at least the extracted audio content to a sentiment analysis model and responsively receiving from the sentiment analysis model sentiment data associated with the audio content.

5. The method of claim 1, wherein using at least the extracted audio content to obtain sentiment data associated with the audio content comprises:
providing at least the extracted audio content to a speech-to-text model and responsively receiving from the speech-to-text model text representing the audio content; and
providing at least the received text to a sentiment analysis model and responsively receiving from the sentiment analysis model sentiment data associated with the audio content.

6. The method of claim 1, wherein using at least the extracted audio content to obtain sentiment data associated with the audio content comprises:
providing at least the extracted audio content to a speech-to-text model and responsively receiving from the speech-to-text model text representing the audio content; and
providing at least the extracted audio content and the received text to a sentiment analysis model and responsively receiving from the sentiment analysis model sentiment data associated with the audio content.

7. The method of claim 1, further comprising:
the computing system obtaining structured data associated with the media content,
wherein using at least the extracted audio content to obtain sentiment data associated with the audio content comprises using at least the extracted audio content and the obtained structured data to obtain sentiment data associated with the audio content.

8. The method of claim 1, wherein outputting for presentation, the generated modified media content comprises transmitting to a presentation device, media data representing the generated modified media content for display by the presentation device.

9. The method of claim 8, wherein the presentation device is a television.

10. The method of claim 1, wherein outputting for presentation, the generated modified media content comprises displaying the generated modified media content.

11. The method of claim 10, wherein displaying the generated modified media content comprises a television displaying the generated modified media content.

12. A computing system configured for performing a set of acts comprising:
obtaining media content;
extracting from the obtained media content, audio content;
using at least the extracted audio content to obtain sentiment data associated with the audio content;
using the obtained sentiment data as a basis to modify a video content component of the media content, thereby generating a modified version of the media content, wherein the extracted audio content represents speech of an actor in the video content, wherein the sentiment data represents an emotion of the actor in the video content, and wherein modifying the video content component of the media content comprises modifying a visual depiction of the actor; and
outputting for presentation the generated modified media content.

13. The computing system of claim 12, further comprising a processor and a non-transitory computer-readable medium having stored thereon program instructions that upon execution by a processor, cause performance of the set of acts.

14. The computing system of claim 12, wherein using the obtained sentiment data as a basis to modify the video content component of the media content comprises using the obtained sentiment data as a basis to modify a facial expression of the actor.

15. The computing system of claim 12, wherein using the obtained sentiment data as a basis to modify the video content component of the media content comprises using the obtained sentiment data as a basis to modify a body movement of the actor.

16. The computing system of claim 12, wherein using at least the extracted audio content to obtain sentiment data associated with the audio content comprises:

providing at least the extracted audio content to a sentiment analysis model and responsively receiving from the sentiment analysis model sentiment data associated with the audio content.

17. The computing system of claim 12, wherein using at least the extracted audio content to obtain sentiment data associated with the audio content comprises:
   providing at least the extracted audio content to a speech-to-text model and responsively receiving from the speech-to-text model text representing the audio content; and
   providing at least the received text to a sentiment analysis model and responsively receiving from the sentiment analysis model sentiment data associated with the audio content.

18. A non-transitory computer-readable medium having stored thereon program instructions that upon execution by a processor, cause performance of a set of acts comprising:
   obtaining media content;
   extracting from the obtained media content, audio content;
   using at least the extracted audio content to obtain sentiment data associated with the audio content;
   using the obtained sentiment data as a basis to modify a video content component of the media content, thereby generating a modified version of the media content, wherein the extracted audio content represents speech of an actor in the video content, wherein the sentiment data represents an emotion of the actor in the video content, and wherein modifying the video content component of the media content comprises modifying a visual depiction of the actor; and
   outputting for presentation the generated modified media content.

* * * * *